Figures 1, 2:
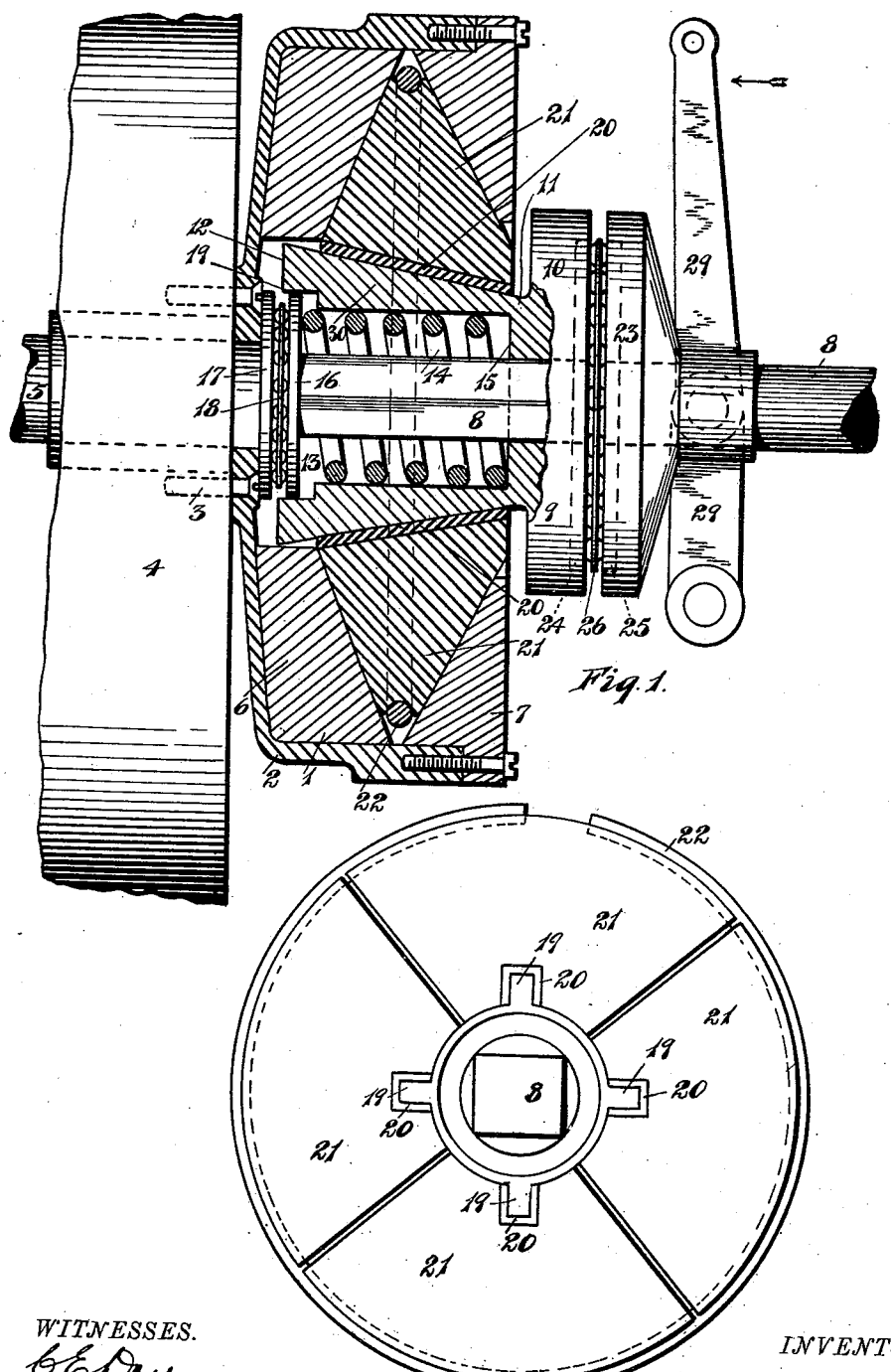

H. W. NICHOALDS.
FRICTION CLUTCH.
APPLICATION FILED OCT. 10, 1910.

1,011,834.

Patented Dec. 12, 1911.

WITNESSES.
C E Day
H. M. Swan

INVENTOR.
Harry W. Nichoalds
by Parker & Burton
by C. F. Burton
Attorneys.

UNITED STATES PATENT OFFICE.

HARRY W. NICHOALDS, OF DETROIT, MICHIGAN, ASSIGNOR TO JOHN B. WHELAN, OF DETROIT, MICHIGAN.

FRICTION-CLUTCH.

1,011,834.   Specification of Letters Patent.   Patented Dec. 12, 1911.

Application filed October 10, 1910. Serial No. 586,185.

*To all whom it may concern:*

Be it known that I, HARRY W. NICHOALDS, a citizen of the United States, residing at Detroit, county of Wayne, State of Michigan, have invented a certain new and useful Improvement in Friction-Clutches, and declare the following to be a full, clear, and exact description of the same, such as will enable others skilled in the art to which it pertains to make and use the same, reference being had to the accompanying drawings, which form a part of this specification.

This invention relates to friction clutches.

It has for its object an improved clutch for coupling shafts.

In the drawings:—Figure 1, is a section longitudinal of the shaft axis through the engaging parts of the coupling head. Fig. 2, is a side elevation of the expanding clutch member.

The clutch consists essentially of two members, one of which is divided into two parts forming a chamber with opposed conically shaped friction surfaces and the other of which is divided into four parts that extend radially. The two part member is hollow and presents friction faces that engage on both sides of the corresponding friction faces of the multiple part expanding member. The multiple part expanding member is substantially a double cone divided into segmental parts which expand radially with respect to the axis of the double cone. The two part member is a double hollow cone, the faces of which remain in constant relation to each other.

The two part member 1 of the clutch consists of a case or shell 2 adapted to be secured to one of the shafts or some mechanism connected with one of the shafts. In the drawing it is shown as secured by bolts or screws 3 to the fly wheel 4 on the driving shaft 5. The shell 2 contains a friction member 6 which may be made as a separate piece or may be made integral with the shell; preferably the shell is made of some material that can be turned or stamped such as steel and the friction part 6 is made of other material that is more suitable for friction grip. It may be cast iron, aluminium, copper or any of the materials which present a greater frictional resistance than the shell member. To the part 1 is secured the opposed bearing friction member 7 made preferably of the same material as friction member 6 and secured either directly to the shell or to the lining as may be most convenient. The requisite feature of construction is that the two frictional parts 6 and 7 lie opposite the one to the other with an internal cavity that is doubly conical in shape. The member 7 has a central aperture through which passes the end of the driven shaft 8. The end of the driven shaft is either squared or provided with some similar means for holding the sleeve 9 that turns with the shaft, but slips freely along the axis of the shaft within the limits of movement allowed to it. The sleeve 9 has an external part 10, a wedge bearing part 30 that projects from the external part and extends from the neck 11 to its terminal 12, which terminal is located deeply within the two part friction member 1. The external part 10 of the bushing is provided with a central perforation that corresponds with the end of the axle 8, either a square perforation or some similar construction by means of which it can be secured to turn with the shaft 8 and slide along the axis thereof. That part of the sleeve 9 which is located within the two part friction member 1 is provided with a cylindrical cavity 13 in which is located a spring 14 that bears against the bottom 15 of the cavity and at the open end of the cavity bears against a washer 16 interposed between the end of the shaft 8 and the end of the shaft 5. The washer 16 is preferably a compound washer consisting of disk 16, disk 17 and interposed ball containing cage 18 making an antithrust bearing between the sleeve 9 in which the spring is located and the end of the shaft 5. Upon the sleeve 9 and the wedging part 30 are longitudinal wedge shaped ribs 19 having their broad end or wide end directed toward the end of the shaft 5 and their narrow end toward the neck 11 of the sleeve 9. These wedges engage in reverse wedge shaped cavities provided with metallic linings 20 in segments 21. There are a number of segments 21 forming a clutch and which equal in number the ribs 19, and each segment is provided with its metallic lined wedge shaped cavity 20; each one of the segments engages over its proper rib and all of the segments are held together by a spring binding split ring 22. The external end of the sleeve 9 engages against a fixed block 23 preferably with an interposed anti-friction end thrust bearing comprising disks 24 and 25 and ball cage 26. The block 23 is mounted on the shaft 8, which passes through a hole in the block and the block is provided with an actuating lever 29 properly pivoted to any fixed member and arranged to actuate the block 23 to push it and the sleeve 9 in a direction toward the end of the shaft 5 and thereby loosen the wedge shaped ribs 19 in their sockets, and allow the friction segments 21 to contract toward the axis of the shaft 8 and revolve freely in the double cone cavity of the member 1. Upon releasing pressure on the lever 29 the spring 14 acts to press the wedges into their cavities, expanding the segments and bringing the parts into frictional clutch.

As described, this clutch is arranged to maintain a constant condition of the frictional clutch, removed only when the pressure is exerted on the lever 29, but the parts can be readily reversed and arranged to run free at times when the pressure is not put upon the lever. The segments engaging on the ribs 19 are always in rotative relation with the sleeve from which the ribs spring and are consequently always in rotative relation with the shaft 8 upon which the sleeve 9 is held to rotate.

What I claim is:—

1. In a friction clutch in combination with a driving shaft a casing fixed thereto and provided with a cavity having oppositely inclined friction faces, a plurality of radially arranged friction members adapted when expanded to engage said friction faces, wedge members adapted to engage therebetween, whereby said friction members may be forced centrifugally, resilient means for normally holding said wedge members in expanding position with reference to said friction members, and means for releasing said wedge members and thereby said frictional members from such position, thereby terminating the frictional engagement, substantially as described.

2. In a friction clutch, in combination with a shaft driven member having a cavity with relatively fixed oppositely inclined friction surfaces, radially movable members adapted to frictionally engage said friction surfaces, a driven shaft, means carried by said driven shaft for holding said radially movable members in contact with said friction surfaces, and means for moving said members centripetally to a position of nonengagement with said friction surfaces, substantially as described.

3. In a clutch, in combination with a pair of coaxially arranged shafts a casing provided with oppositely inclined bearing faces, carried by one of said shafts, a plurality of radially movable friction members rotatably arranged about the other of said shafts, a washer between the adjacent ends of the shafts, a sleeve provided with wedge faces fixed to that shaft about which said friction members are arranged, means for normally maintaining said sleeve in expanding position with respect to said friction members, and means for changing said sleeve member from said normal position.

4. In a clutch, the combination of a driving shaft, a driven shaft in alinement therewith, a casing provided with oppositely inclined friction faces, carried by one of said shafts, said faces being maintained in constant relation to one another, a plurality of radially movable friction members engaging within said casing, a sleeve provided with wedge faces, keyed to the other shaft, means for holding said friction members in engagement with the friction faces of the casing, means for yieldingly holding the friction members out of engagement with the friction surfaces of said casing, and means for actuating said sleeve lengthwise of its shaft out of centrifugally actuating contact with said movable friction members, whereby they are released from positive engagement with the friction surfaces of said casing, substantially as described.

5. In a clutch, the combination of a casing having a cavity provided with friction surfaces of opposing angularity maintained in constant relative relation, a shaft to which the same is fixed coaxially therewith, a second shaft in alinement with said first shaft, a sleeve provided with inclined bearing faces keyed to said second shaft though movable lengthwise thereof, means for moving said sleeve lengthwise of said second shaft, and a plurality of radially movable friction members interposed between the friction surfaces of said casing and the bearing faces of said sleeve, adapted to be forced into and out of engaging position with respect to said friction surfaces according to the longitudinal movement of said sleeve along its supporting shaft, substantially as described.

In testimony whereof, I sign this specification in the presence of two witnesses.

HARRY W. NICHOALDS.

Witnesses:
CHARLES F. BURTON,
VIRGINIA C. SPRATT.

---

Copies of this patent may be obtained for five cents each, by addressing the "Commissioner of Patents, Washington, D. C."